United States Patent
Ciccotti et al.

(10) Patent No.: US 8,013,940 B2
(45) Date of Patent: Sep. 6, 2011

(54) INTEGRATED STATION FOR RECORDING AND TRANSMISSION OF AUDIO AND VIDEO SIGNALS

(76) Inventors: Stefano Ciccotti, Rome (IT); Aldo Mancino, Rome (IT)

(*) Notice: Subject to any disclaimer, the term of this patent is extended or adjusted under 35 U.S.C. 154(b) by 1356 days.

(21) Appl. No.: 11/587,005

(22) PCT Filed: Apr. 15, 2005

(86) PCT No.: PCT/IB2005/051247
§ 371 (c)(1),
(2), (4) Date: Oct. 20, 2006

(87) PCT Pub. No.: WO2005/104542
PCT Pub. Date: Nov. 3, 2005

(65) Prior Publication Data
US 2007/0222869 A1   Sep. 27, 2007

(30) Foreign Application Priority Data
Apr. 21, 2004  (IT) .............................. RM2004A0198

(51) Int. Cl.
H04N 5/222  (2006.01)
H04N 9/74  (2006.01)

(52) U.S. Cl. .......................... 348/722; 348/586; 348/587
(58) Field of Classification Search ................. 348/722, 348/584, 586–588, 591, 592; 352/4; H04N 9/74, H04N 9/75, 5/222
See application file for complete search history.

(56) References Cited

U.S. PATENT DOCUMENTS

| 5,574,604 | A | | 11/1996 | Berg et al. |
| 6,034,740 | A | * | 3/2000 | Mitsui et al. ................... 348/587 |
| 6,072,537 | A | * | 6/2000 | Gurner et al. ................. 348/586 |
| 2003/0086684 | A1 | | 5/2003 | Smith et al. |

FOREIGN PATENT DOCUMENTS

WO   01/08415 A   2/2001

* cited by examiner

Primary Examiner — Sherrie Hsia
(74) Attorney, Agent, or Firm — Nixon & Vanderhye P.C.

(57) ABSTRACT

An integrated station for recording and sending audio and video signals, apt to have remote access to telecommunication networks for carrying out information services and prearranged for implementing camera set-ups and for transmitting broadcast-quality audio and video signals. The station includes a temporary camera set-up for acquiring broadcast-quality audio/video signals and includes multiple wing panelling which may have a column-shaped structure with wings that may be opened to provide a background for television shooting.

20 Claims, 5 Drawing Sheets

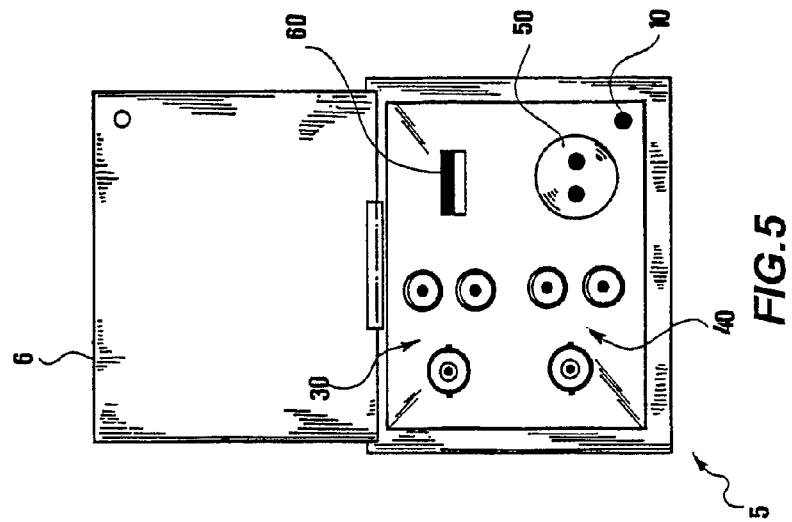
FIG. 5
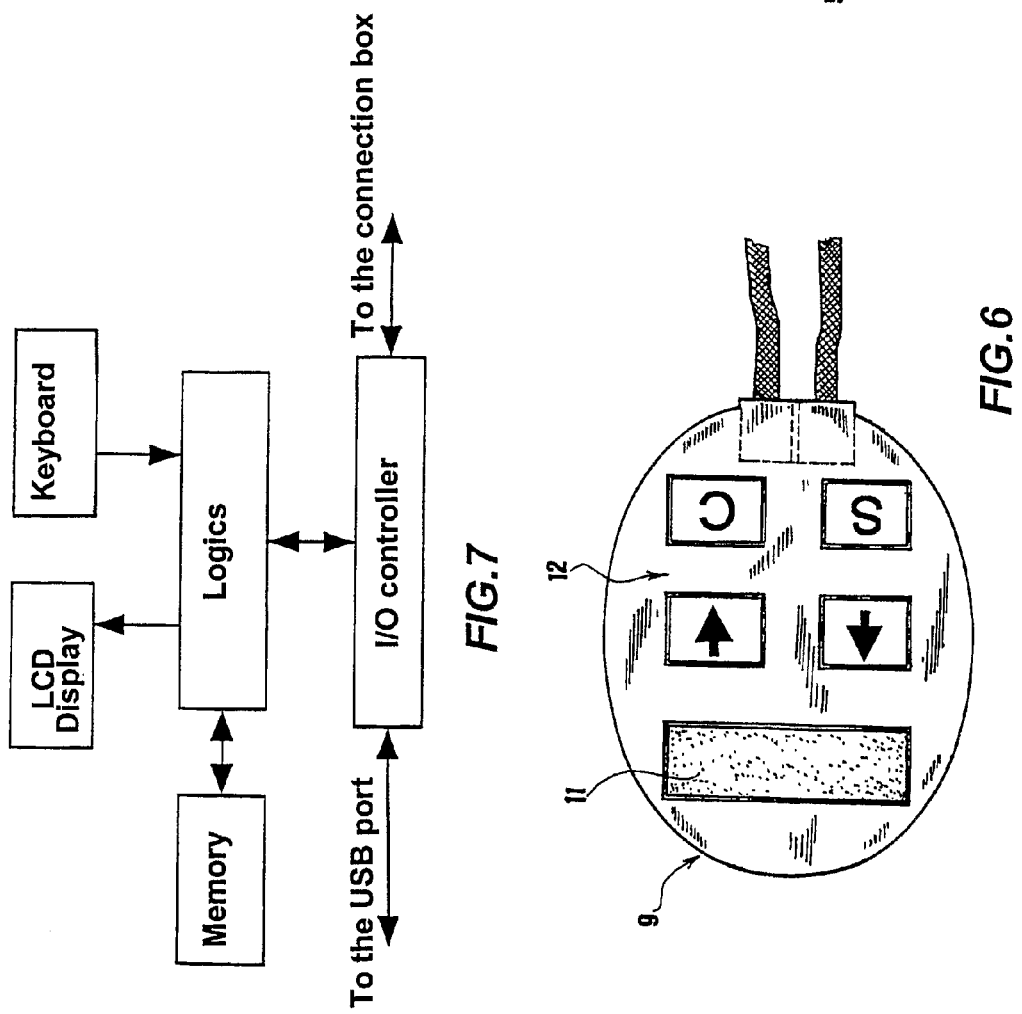
FIG. 7
FIG. 6

| Main menu | | | | | | | |
|---|---|---|---|---|---|---|---|
| Display | | | | | | | Meaning |
| | 1 | 2 | 3 | 4 | 5 | 6 | |
| C O D E | - | | | | | | Identification code display |
| S T A R T | | | | | | | Transfer start allowed |
| E N D | | | | | | | Transfer end detected |
| S Y N C H | L | O | S | S | | | Input video synchronism loss |
| N O A U D I O | | | | | | | Audio signal absence detected |
| F U N C T I O N | | | | | | | Enter function area (which can be activated by pressing S) |
| Function menu (items displayed by means of arrow keys and chosen by the S key) | | | | | | | |
| 1 . P L A Y | | | O | U | T | | Transfer functions |
| 2 . C H R O M A | | | | | | | Chroma-key functions |
| 3 . F I L E | | | | | | | File transfer functions |
| 4 . B I L L | | | | | | | Account data transfer function |
| 5 . E X I T | | | | | | | Back to the main menu |

*FIG.8*

INTEGRATED STATION FOR RECORDING AND TRANSMISSION OF AUDIO AND VIDEO SIGNALS

This application is the US national phase of international application PCT/IB2005/051247, filed 15 Apr. 2005, which designated the U.S. and claims priority of IT RM2004A000198, filed 21 Apr. 2004, the entire contents of each of which are hereby incorporated by reference.

The present invention refers to an integrated station for recording and transmission of audio and video signals.

In particular, it proposes an automatic station equipped with means for the remote access to telecommunication networks for carrying out information services, arranged for implementing camera set-ups and for the subsequent transferring of broadcast-quality audio and video signals.

The invented apparatus can be applied in the information services' field, in particular in those related to the implementation and distribution of radio-television-type information from positions outside the common studios which have been properly prepared for shootings.

BACKGROUND OF THE INVENTION

In the current state of art, the radiotelevision companies performing shootings, by acquiring broadcast-quality audio and video data, in remote locations not housing radiotelevision studios are obliged to send the recorded material, under the form of magnetic and/or optic media, to the postproduction centres, by having recourse to the physical transportation or by leasing satellite mobile stations.

Both solutions adopted in the state of art imply considerable drawbacks, the most evident thereof are the too long time elapsing between shipping and receiving the material and the very huge costs linked to the lease of satellite mobile stations, respectively.

Furthermore, during the shooting on location, television cameras and lighting projectors are generally powered by a battery set with limited duration constraining pressingly the operators' work.

The use of real equipped studios, then, reveals to be necessary if one wishes to make shootings for prolonged periods or according to such techniques so as to require, for example, the use of pre-arranged backgrounds.

From what has been described, it can be deduced that currently the telecommunication networks for the transmission of broadcast-quality audio and video signals cannot be made available in a simple and cheap way and that the shootings carried out outside radiotelevision studios are conditioned by huge structural limits.

U.S. Pat. No. 6,574,604 discloses an internet message system enabling a user to compose an electronic greeting message and transmit the greeting message to any e-mail address over the Internet. The internet message system is housed within a self-contained unit, such as a kiosk. In operation, the user selects from a variety of selectable greeting formats, including images, video segments, audio segments and text message lines, and combinations thereof. Once the greeting is composed, it can be instantly transmitted over the Internet to the intended electronic mail address.

Nevertheless, such a system does not completely solve the problem of transmitting television type broadcast-quality signal over a telecommunication network. Furthermore, does not provides for any support to the user for recreating a filming studio during "on location" shooting.

BRIEF SUMMARY OF THE INVENTION

The present invention proposes the implementation of integrated stations helping the shootings of "on location" television type, to be located on site, so as to integrate the functions of remote access to telecommunication networks for the transferring of broadcast-quality audio and video signals, the functions of camera set-ups for the acquisition and means for the preliminary processing of the signals themselves, so as including multiple wing panelling, if required and according to the operators' needs.

The present invention provides some relevant and new advantages.

First of all, an integrated station according to the present invention allows a considerable time and cost reduction related to the transmission of broadcast-quality video and audio data, by means of proper connection means, from and towards a network for terrestrial or satellite telecommunications.

This result is obtained thanks to the presence of means for preparing in situ a temporary delocalized television camera set-up.

The station is formed, in fact, like an intermediate structure supporting the system for shooting and transferring the signals mentioned above by integrating, in the station itself, additional means replacing the ones which generally belong to classic television studios.

In fact, the present invention allows an operator to prepare a real set also suitable for shootings carried out according to specific technologies such as the "chroma-key" technique.

Furthermore, an operator could connect the set's shooting and lightning means to the station. According to a preferred embodiment, the station also comprises means for authenticating the user, used to identify the users and handle the access to the station in a safe way.

Such stations, being equipped with interfaces of different nature, further allow to acquire and process audio/video data in broadcast format according to the desired modes, to transfer the so-obtained data towards the network thereto the station has access so that they are sorted and then delivered to postproduction centres, to receive as feedback an immediate check of one's activity.

Consequently, the present invention allows concentrating, among the stand-up-type position placed in different exemplars on the territory, each one covering a determined interest area, the means apt to perform operations which in the state of art result to be carried out in a time-wasting and expensive way by systems which are not directly interconnected and integrated therebetween.

In this way, the problems set by the transportation of means for the shooting on location, by the power supply thereof and by the assembly thereof as well as by the transferring of the collected information to the postproduction centres are overcome once for all.

Furthermore, the present invention comprises means for the preliminary processing in situ of the information collected with modes and techniques so that, however, the only alternative which could be proposed according to the state of art would be to have recourse to television studios of traditional type, with the space and time constraints deriving therefrom.

Furthermore, a station according to the present invention, is conceived so that, without a user interested in having access to the utilities of the station itself for carrying out the operations described above, the same station can assume an additional function of street furniture complement and, in case, of system for distributing information, for example, linked to the specific site wherein it is positioned (technical, stock exchange, political, etc., information).

Other advantages, features and utilization modes of the present invention will be evident from the following description of a preferred embodiment, shown by way of example and not for limitative purposes.

BRIEF DESCRIPTION OF THE DRAWINGS

The drawings of the attached figures will be referred to, wherein:

FIG. 5 represents a connection box containing connection means for peripheral units;

FIG. 6 shows a front view of an actuator's command panel;

FIG. 7 is a block diagram representing the actuator's connections and the relationships between the functions thereof;

FIG. 8 represents an example of the semantics according thereto messages and functions of various type are displayed onto the actuator's display.

DETAILED DESCRIPTION OF THE INVENTION

Figure 1:
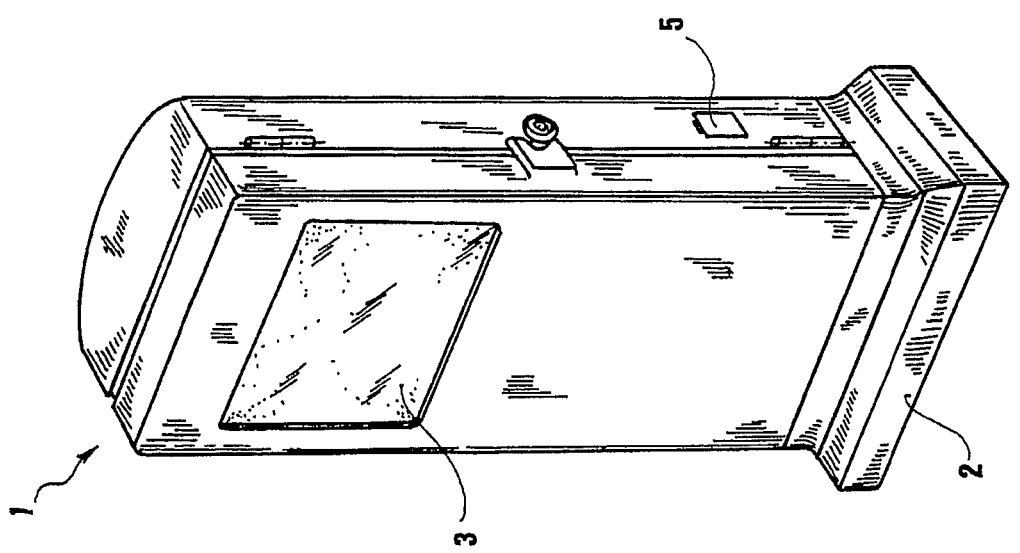
FIG. 1 is a perspective view of the station in the configuration related to the operation thereof as street furniture complement and/or system for distributing information.

By referring to FIG. 1, an integrated station 1 according to the present invention as a column-shaped, preferably watertight and burglar-resistant structure and on the outside it is like a metallic box placed onto a pedestal.

The base 2 of said pedestal is anchored to the floor in areas inside the buildings or outside them, in accessible places.

The box sizes can vary according to the possible configurations, typically they can assume values, in width, height and depth respectively, in the order of 800, 2000 and 300 mm.

The station 1, through proper adapting interfaces, is connected to networks for terrestrial (for example optical fibre or radio-frequency communications) and/or satellite (by adopting a suitable transmitting terminal) telecommunications. Furthermore, it is connected to the power mains.

The station comprises screens and/or panels 3 which may have a purely decorative function or which can be suitable to transmit information messages of various kind, generated locally or remotely.

Figure 2:
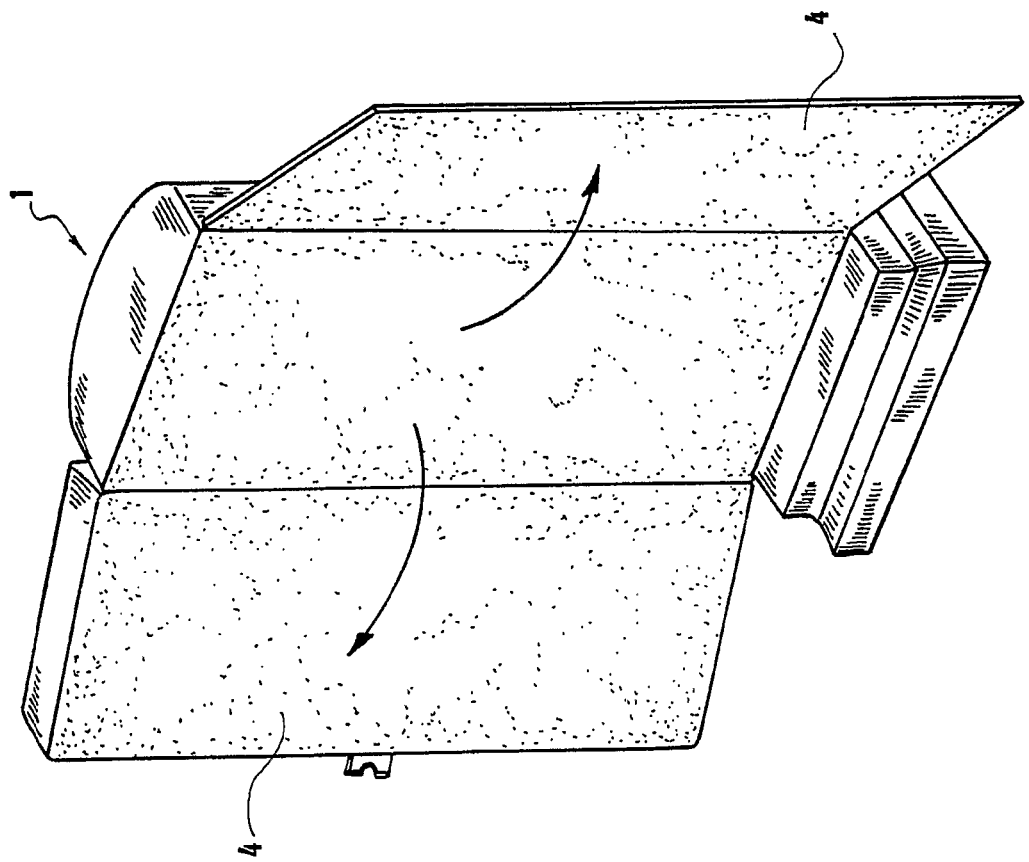
FIG. 2 is a perspective view of the station which it is configured when it is utilized as camera set-up.

A multiple-wing panelling 4 is closed onto one of the column's surfaces, for example onto the main frontal, which can be opened and so that, once unfolded, it can allow implementing easily a wide background for radio-television shootings, as it can be seen in FIG. 2.

Such background can be equipped with the (chromatic and the like) features necessary so that it can act as screen for television shootings, for example according to a technique of "chroma-key" type.

An access connection box 5, represented in FIG. 5, is obtained on a side of the box or onto the surface opposite to the main frontal thereof, protected by a hinged cover, containing connection means, such as plugs and ports of various type for the connection to outer systems of different kind and means for providing power supply to outer apparatuses.

Figure 3:
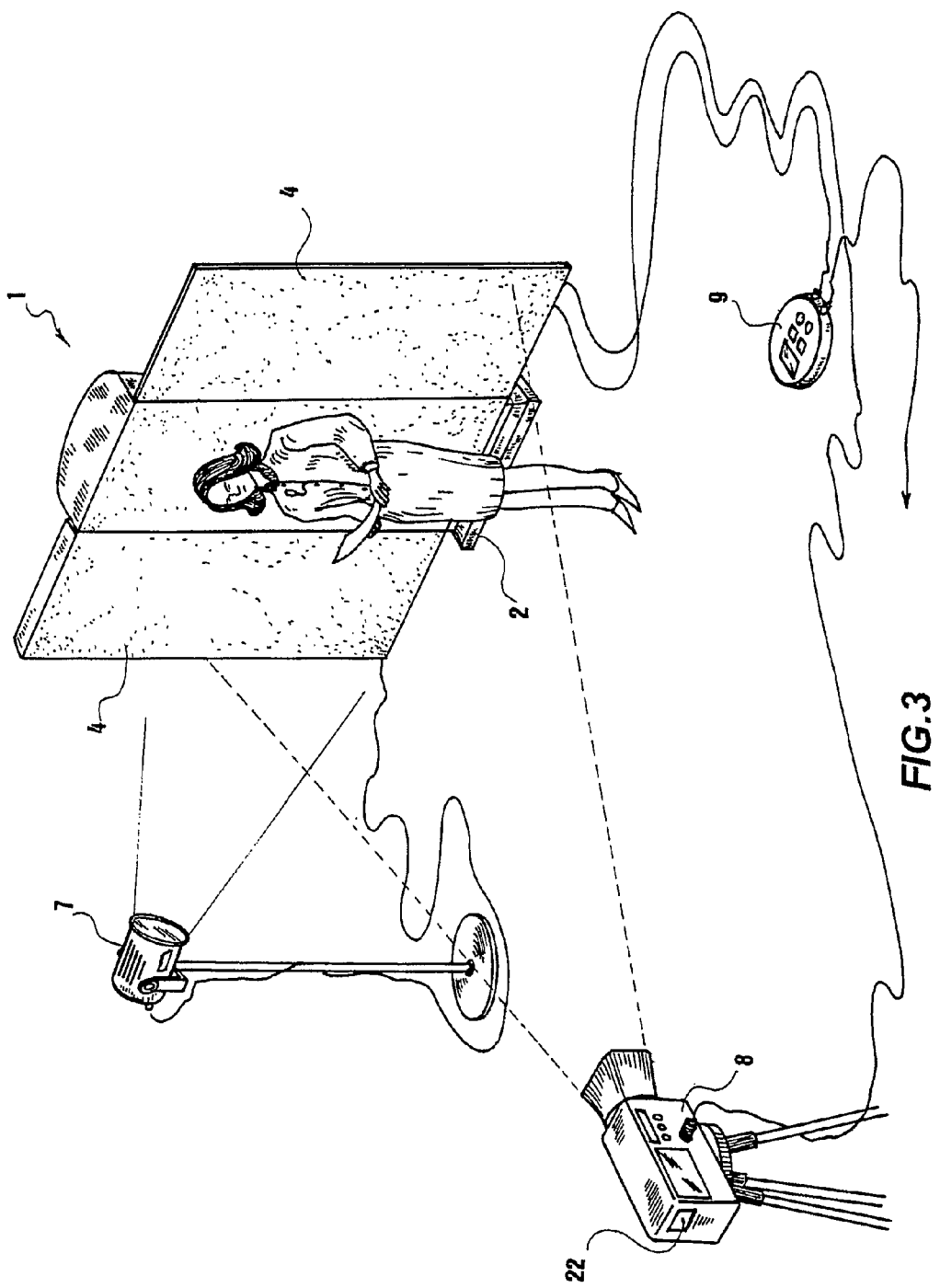
FIG. 3 is a perspective view of the station which it is configured when it is utilized as camera set-up, with some of the possible connected peripheral units.

Such outer apparatuses can be, for example, the set's lightning systems 7, systems for shooting 8 and transferring audio and video signals, systems for audio/video monitoring the performed activities, as it can be seen in FIG. 3.

In particular, in FIG. 5 input ports 30 for video and audio data can be seen, as well as output ports 40 for video and audio signals aimed at providing an output useful to check the shot material as it has been edited.

The connection box 5 also includes a microswitch 10 which, once it has been closed, allows the user to make the station passing from the usual stand-by state into the pre-operational one with all active systems.

Inside the access connection box there are also a plug 50 for the connection to the power mains and a USB port 60.

An actuation and storage peripheral unit 9 can be connected to such USB port 60, with a dedicated cable, which unit, in turn, can be connected to a PC by means of an additional autonomy USB port.

Such peripheral unit 9, also called actuator, is optional and it is able to extend the operative capabilities of the station itself.

It assumes the shape of a plastic container with respective average sizes in the order, for example, of 100, 20 and 80 mm.

A liquid crystal display 11 (LCD) is housed onto a surface thereof. The display can be, for example, a display with single row, able to display preferably at least twelve alphanumeric characters. The actuator further comprises actuation keys 12, for example four in number, the first one thereof, marked by a S, is apt to choose the functions to be carried out; the second one, marked by a C, is apt to cancel; the remaining two keys show the symbols of two arrows upwards and downwards and they are utilized for scrolling the functions and the commands therewith the actuator is equipped.

In such peripheral unit 9 several functions are implemented, some thereof are described hereinafter for exemplifying and not exhausting all the uses thereto a so-conceived actuator is suitable.

In case of a simple transferring from a reproducer of audio/video data, for example without monitors associated to the shooting equipment, the actuator 9 allows displaying an identifying code and the information related to the transferring state onto the display.

In case of using the station as camera set-up, the actuator 9 further allows: to send direct commands to the station 1 (for example aimed at choosing one of the backgrounds of chroma-key type available in the electronic libraries included in the memory of the station itself); to store the technical information related to the performed transferring and, in case, to store a compressed audio/video file partially or wholly reproducing the content of sent information, according to the actuator's memory availabilities; to transfer to the station 1 data files already stored in advance onto the memory of the actuator 9 itself, so that they are sorted and sent to post-production remote units; to stock onto the memory of the actuator itself the pre-invoicing data related to the service rendered to the user by the station.

In FIG. 8 an example of the semantics is shown, according thereto the messages showing the state of the operations and the several implemented functions, which can be chosen from a menu which can include a variable number of items, are displayed onto the actuator's display 11.

Figure 4:
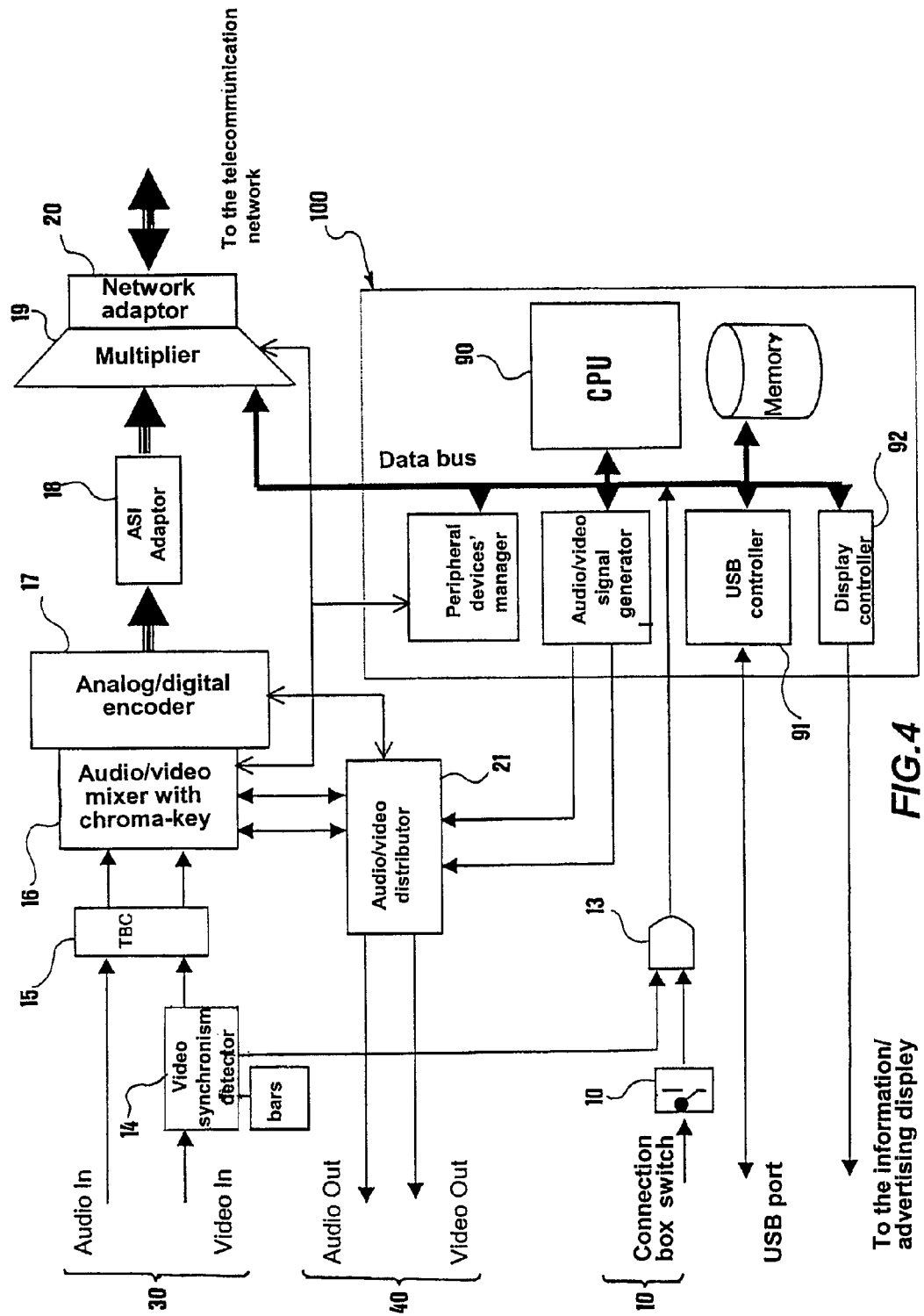
FIG. 4 is a block diagram illustrating the connections and the interactions of the apparatuses comprised and integrated into the station.

The integrated station 1, conceived in this way, is an apparatus comprising several devices interconnected therebetween, as it can be seen from the block diagramme of FIG. 4.

Such devices perform a minimum set of independent functions and include respective and dedicated hardware units, thereon appropriate firmware is stored.

They are controlled by a microprocessor 90, a CPU, inside a control central unit 100 containing the members providing for the operations' coordination.

Some of the mentioned devices belong to the control unit 100 itself and constitute interface means for outer peripheral devices such as for example the ones described above, by adjusting the reception by the latter of signals of various kind, by means of the specified ports and plugs contained in the connection box 5.

Other devices, equally inside the control unit 100, arrange the coordinated operation of the apparatuses providing for the fulfilment of the inner functions of the station 1, from the first processings on the input audio and video signals until arriving to the interface with the telecommunication networks and to the contemporary transfer therein of the processed signals.

Among the devices for processing and adapting the data there are included, in a exemplary and not exhaustive list: a user's access detector 13; a TBC corrector of the synchronisms of video signals 15; an audio-video mixer 16 for implementing in situ chroma-key editing and for the presentation of dedicated signals; an analog/digital converter 17 of the transferred signals; a multiplier 19 of the main transferring signal with the auxiliary signals necessary for establishing the communication with a Remote Sorting Centre; an adapter 20 of the signal resulting to the telecommunication network thereto the station is connected.

The mentioned control devices inside the control unit 100 include a unit 91 for having access to an outer peripheral device, here exemplified by the actuator 9, by means of a USB port and a unit 92 for managing the outer display 3 obtained onto the surface of the metallic box and arranged for displaying the information messages of different kind.

Nevertheless, the operation and coordination of all these apparatuses is to be considered within the capacity of a person skilled in the art and therefore a detailed description thereof will not be provided here.

After having closed a microswitch 10 included in the connection box having access to the station, the processor inside the station 1 detects the presence of a connection and requests the user identification so as to make possible the passage from the stand-by state, wherein the station 1 usually is, into an operational state with the subsequent activation of all the systems.

The access to the functions of the station 1, in fact, is controlled by a user authenticating system which operates by establishing a communication with the mentioned Remote Sorting Centre, thereto an exchange of information remains associated, aimed indeed at performing the user recognition.

Such Remote Sorting Centre (CRS), apart from delivering the audio/video signals related to shot films to the post-production studios, is arranged for treating, with related feedback, each type of "service" information coming from the station.

The authentication takes place by locally generating a pseudocasual alphanumeric code distinguishing the user, for example with 6 digits.

It can be displayed by the user himself/herself, by means of a generator of video signals, onto a display 22 belonging to an outer unit, for example represented by the integrated monitor of the telecamera 8 and it is contemporary sent to CRS for the recognition.

The user, in turn, for example by means of a common mobile phone, sends to the CSR the code read onto said display 22, for example by exploiting a phonic message system or SMS of the radiomobile GSM network.

Then, the CRS will have to provide for controlling the correspondence between the locally generated code and the received one, as well as identifying the user by means of the SIM number, stored in advance into a specific users' file with access right filed with CRS.

Once in the operational state, the station 1 is ready to acquire the audio/video signals and it detects by means of a device 14 the presence of the input video signal coming from the video sources 8, by commuting with respect to a fixed identifying signal usually present, for example, under the form of colour bars.

The video signals coming from the video sources 8 are then corrected and synchronized by a Time Base Corrector 15 (TBC) in order to improve the accuracy and stability thereof.

The audio and video signals are then mixed by a mixer 16 for the audio/video editing.

The user has a direct check of the result of this mixing operation; in fact, by means of an audio/video distributor 21, he/she can be able to see said signal outputted from the mixer 16, locally reproduced onto a screen therewith he/she is equipped.

In order to keep the highest resolution and fidelity, an encoder 17 carries out the analog/digital conversion of the input audio/video signal with broadcast quality.

Thanks to an adaptor 18, for example in conformity with ASI standard, the data transmission format is fitted to its own standard of the telecommunication networks therewith the station is interfaced.

Then, the passage through a multiplier 19 of the main transferring signal with the signals necessary for establishing the communication with the CSR and then the passage through an additional adapter 20 of the signal resulting to the telecommunication network follow.

Such latter adaptor 20 can include, for example, a bridge having the protocol compatible with the network and allowing the electro-optic conversion if, for example, the network is an optical fibre network.

The CRS, as already illustrated, can distribute a return signal, by means of a dedicated service channel different from the one thereon the stream of audio/video signals is conveyed, which is mixed to the source signal and outputted for the authentication and monitoring functions.

The end of the transmission phase is signalled by the absence of incoming video signal for a period of time longer than a pre-established threshold value.

The local operating system, based upon the data received by the CSR, provides for underlining that the operation had a successful conclusion with a message onto the output monitor therewith the user is equipped.

The control operating system itself, inside the station, can further request and/or suggest the data transfer into a USB memory outer unit 9, that is in the actuator. Among other things, such data can include a summary card of the sequence of the performed operational steps, also depending upon a possible pre-invoicing procedure of the services utilized by the user.

Thereafter, the station 1 is returned to the stand-by state.

If not operating according to the camera set-up mode, the station 1 is able to distribute, as said, audio/video signals to an outer screen 3 installed onto the front panel for information/advertising purposes; this function is performed by a controlling device based upon signals generated locally or sent to the station by the CRS.

The present invention has been sofar described according to a preferred embodiment thereof shown by way of example and not for limitative purposes.

It is to be meant that other embodiments can exist, all comprised within the protective scope of the same invention, as defined by the enclosed claims.

The invention claimed is:

1. An integrated station helping the shootings of "on location" television, apt to acquire broadcast-quality audio/video signals and the transmission thereof onto a telecommunication network, said station comprising means for preparing in situ a temporary camera set-up for acquiring said broadcast-quality audio/video signals, characterized in that said means for preparing a temporary camera set-up comprises a multiple-wing panelling (4) capable of being opened, so as to provide a background suitable for shootings of television.

2. The integrated station according to claim 1, further comprising means for the preliminary processing of said audio/video signals.

3. The integrated station according to claim 1, further comprising means for the remote access to telecommunication networks and for the transmission of broadcast-quality audio and video signals onto said networks.

4. The integrated station according to claim 1, wherein said panelling (4) represents a background suitable for shootings with chroma-key technique.

5. The integrated station according to claim 1, comprising a watertight and burglar-resistant column-shaped structure.

6. The integrated station according to claim 5, wherein said column-shaped structure is a metallic box.

7. The integrated station according to claim 5, wherein said column-shaped structure is anchored to the floor by means of a pedestal (2).

8. The integrated station according to claim 1, comprising an access connection box (5) obtained onto an outer wall of the station.

9. The integrated station according to claim 8, wherein said access connection box (5) is protected by a hinged tipping cover (6).

10. The integrated station according to claim 8, wherein said access connection box (5) includes connection means for the connection to outer systems.

11. The integrated station according to claim 10, wherein said connection means comprises ports (30) for entering audio/video data, ports (40) for outputting audio/video signals, plugs (50) for the connection to a power mains and a USB port (60).

12. The integrated station according to claim 8, further comprising a peripheral unit (9), capable of being connected to said USB port and comprising means for actuating commands.

13. The integrated station according to claim 12, wherein said peripheral unit (9) comprises means for displaying data.

14. The integrated station according to claim 12, wherein said peripheral unit (9) comprises means for storing data.

15. The integrated station according to claim 12, wherein said peripheral unit (9) comprises a liquid crystal display (11) and keys (12) for selecting and actuating commands.

16. The integrated station according to claim 8, wherein said connection box (5) includes a microswitch (10).

17. The integrated station according to claim 1, further comprising authentication means apt to control the access to the station.

18. The integrated station according to claim 1, further comprising screens and/or panels (3) pre-arranged for distributing information messages.

19. The integrated station according to claim 18, wherein said information messages are generated locally or remotely.

20. The integrated station according to claim 18, further comprising an outer display (3) for displaying said information messages.

* * * * *